United States Patent
Pourre

(10) Patent No.: US 12,092,243 B2
(45) Date of Patent: Sep. 17, 2024

(54) DEVICE FOR ASSEMBLY AND ATTACHMENT OF A PAIR OF OPENINGS

(71) Applicant: SOGEFI AIR & COOLING, Guyancourt (FR)

(72) Inventor: Olivier Pourre, Bennwihr (FR)

(73) Assignee: SOGEFI AIR & COOLING, Guyancourt (FR)

( * ) Notice: Subject to any disclaimer, the term of this patent is extended or adjusted under 35 U.S.C. 154(b) by 547 days.

(21) Appl. No.: 16/976,834

(22) PCT Filed: Feb. 21, 2019

(86) PCT No.: PCT/EP2019/054283
§ 371 (c)(1),
(2) Date: Aug. 31, 2020

(87) PCT Pub. No.: WO2019/170423
PCT Pub. Date: Sep. 12, 2019

(65) Prior Publication Data
US 2021/0003234 A1     Jan. 7, 2021

(30) Foreign Application Priority Data
Mar. 5, 2018   (FR) ..................... 18 51887

(51) Int. Cl.
*F16L 21/08* (2006.01)
*F16L 21/035* (2006.01)
*F16L 21/04* (2006.01)
*F16L 37/098* (2006.01)

(52) U.S. Cl.
CPC ............. *F16L 21/04* (2013.01); *F16L 21/035* (2013.01); *F16L 21/08* (2013.01); *F16L 37/098* (2013.01)

(58) Field of Classification Search
CPC ......... F16L 21/02; F16L 21/04; F16L 21/035; F16L 21/03; F16L 21/08; F16L 37/08; F16L 37/098; F16L 37/1215; F16L 37/133; F16L 39/00; F16L 39/06
See application file for complete search history.

(56) References Cited

U.S. PATENT DOCUMENTS 3,432,176 A     3/1969  Valenziano
5,655,795 A *   8/1997  Strnad .............. F02M 35/10144
                                                    285/379

FOREIGN PATENT DOCUMENTS

WO    2013054815    4/2013
WO    2018020172    2/2018

* cited by examiner

*Primary Examiner* — Aaron M Dunwoody
(74) *Attorney, Agent, or Firm* — IPSILON USA, LLP

(57) ABSTRACT

A device for assembling a pipe with a receiving opening is provided, including a first structure bearing an interface surrounding a first opening. The interface has at least one peripheral skirt. A second structure bears an interface surrounding a second opening. A peripheral sealing gasket seals the junction between the two interfaces. The two interfaces are positioned facing each other so that the skirt of the first interface is positioned on the periphery of the second cooperating interface surrounding the second opening, and so that this skirt has at least a portion of the sealing gasket against the second interface.

8 Claims, 3 Drawing Sheets

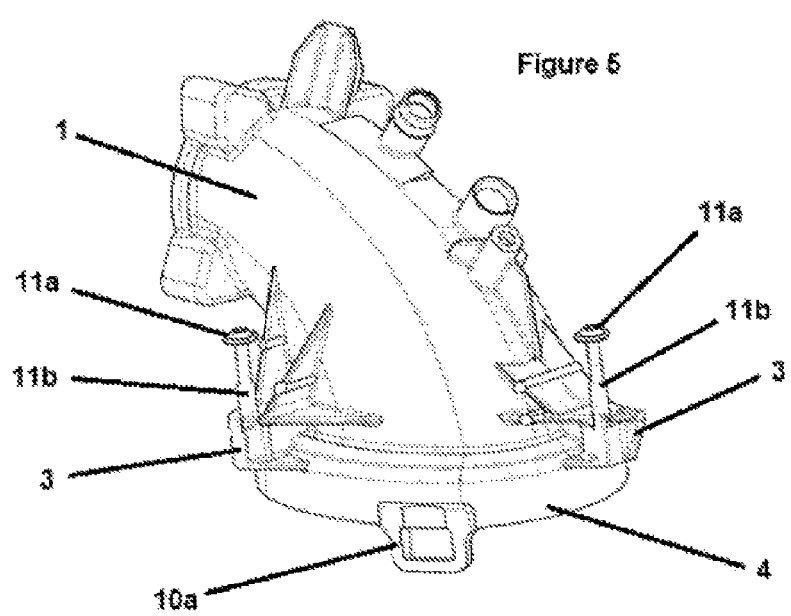

DEVICE FOR ASSEMBLY AND ATTACHMENT OF A PAIR OF OPENINGS

RELATED APPLICATION

This application is a National Phase of PCT/EP2019/054283 filed on Feb. 21, 2019 which claims the benefit of priority from French Patent Application No. 18 51887, filed on Mar. 5, 2018, the entirety of which are incorporated by reference.

FIELD OF THE INVENTION

The present invention relates to the field of the mechanisms for assembling and fixing a pair of elements for positioning their orifices facing one another and, more particularly, to the mechanisms for assembling a pipe on the orifice of a receiving structure in a motor.

DESCRIPTION OF RELATED ART

Assembling the orifice of a pipe on a receiving structure such as a manifold is done by insertion so that a skirt disposed at the periphery of the orifice of one of the parts, on the one hand, jackets the join of the two orifices and, on the other hand, keeps a seal under pressure at this join.

This mounting by insertion is generally done manually by forceful positioning so that the seal is compressed at the periphery of the join between the two orifices being connected.

In addition, as illustrated in the publication FR 2891874, the compressed seal is kept pressed between the pipe and the receiving structure by a position-holding mechanism.

However, the manual forced placement of the pipe against the receiving structure is done against the reaction of the compressed seal. This reaction makes the assembly of the parts difficult and can lead to a problem of alignment with an inclination of the end surface of the pipe relative to the surface of the receiving structure. An alignment defect can then lead, on the one hand, to a sealing problem at the join of the two orifices and, on the other hand, to an alteration of the flow of fluid moving between the pipe and the receiving structure.

OBJECTS AND SUMMARY

The aim of the present invention is to overcome this drawback by proposing a mechanism which allows for an easy assembly of a pipe with the receiving structure of a manifold so that the compression of the seal which ensures the join between the orifices does not affect the assembly operation.

Thus, the subject of the invention is a device for assembling and fixing the orifice of a pipe with a receiving orifice to cooperate, characterized in that the device comprises:
- a first structure bearing a first cooperation interface surrounding a first of the two orifices, this interface comprising at least one skirt disposed on at least a portion of the periphery of the first orifice,
- a second structure bearing a second cooperation interface surrounding the second orifice,
- a seal disposed between the first cooperation interface and the second cooperation interface, the first cooperation interface being positioned facing the second cooperation interface so that:
  - the skirt of the first interface is positioned at the periphery of the second cooperation interface surrounding the second orifice, and
  - the skirt of the first interface and/or an extension of the skirt compresses at least a part of the seal against a part of the second interface.

The invention also relates to a method for implementing an assembly device according to the invention, characterized in that the method comprises:
- a step of positioning the orifice of the first structure facing the orifice of the second structure, on either side of a seal,
- a step of positioning the skirt of the first structure at the periphery of the second cooperation interface of the second structure and against the seal,
- a step of bringing the first structure toward the second structure by the implementation of at least one tightening means, so that the skirt of the first structure pushes back the seal against a surface of the second structure, while the skirt of the first structure slides along the periphery of the second cooperation interface of the second structure.

BRIEF DESCRIPTION OF THE DRAWINGS

The invention will be better understood from the following description which relates to a preferred embodiment, given as a nonlimiting example, and explained with reference to the attached schematic drawings, in which:

FIG. 5 is a schematic representation of an example of a part of manifold type which incorporates an assembly and fixing device according to the invention.

DETAILED DESCRIPTION

Figure 1:
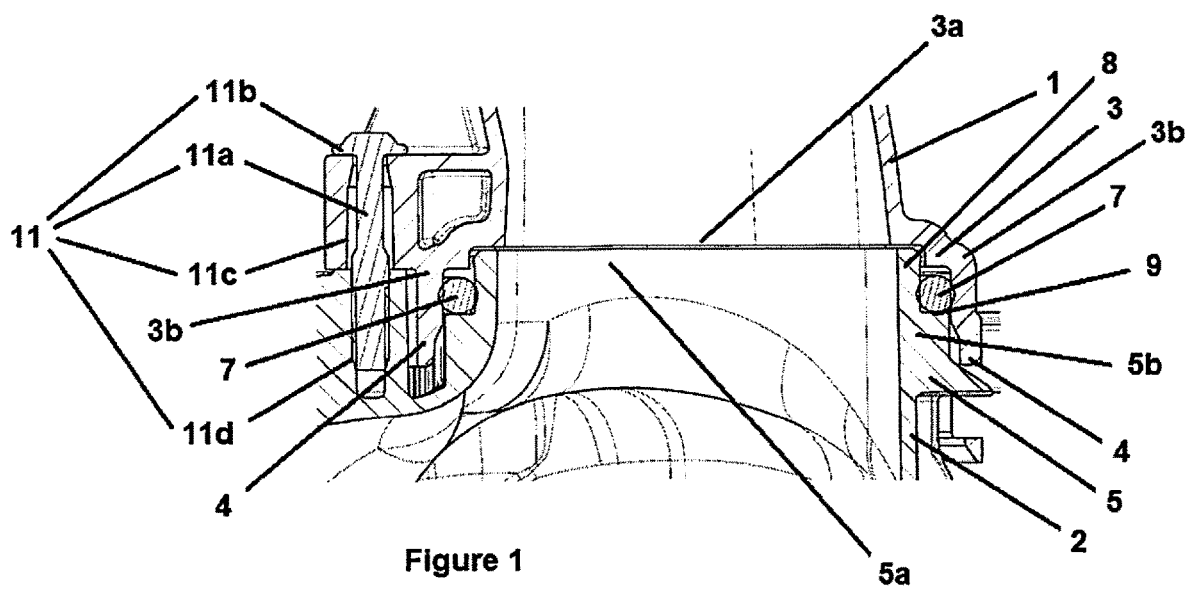
FIG. 1 is a schematic representation of an example of assembly and of fixing of the orifice of a pipe with a receiving orifice using a device according to the invention.
Figure 2A:
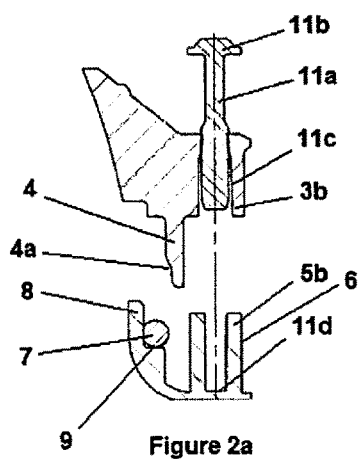
FIGS. 2a to 2d are a schematic representation of an example of kinematics of a detail of the assembly and fixing device according to the invention.
Figure 2B:
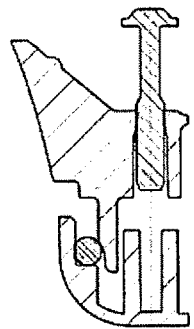
Figure 2C:
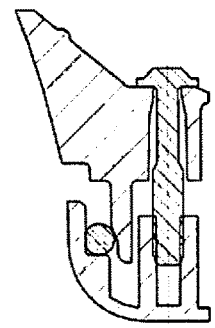
Figure 2D:
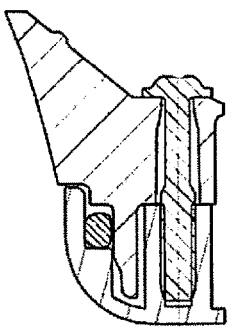
Figure 3:
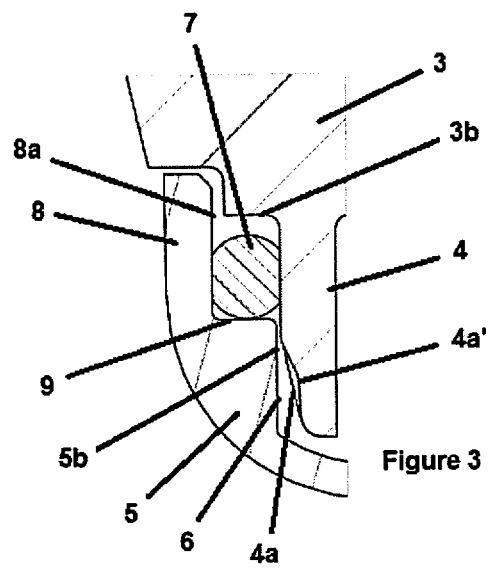
FIG. 3 is a schematic representation of an example of detail of an assembly and fixing device according to the invention.
Figure 4A:
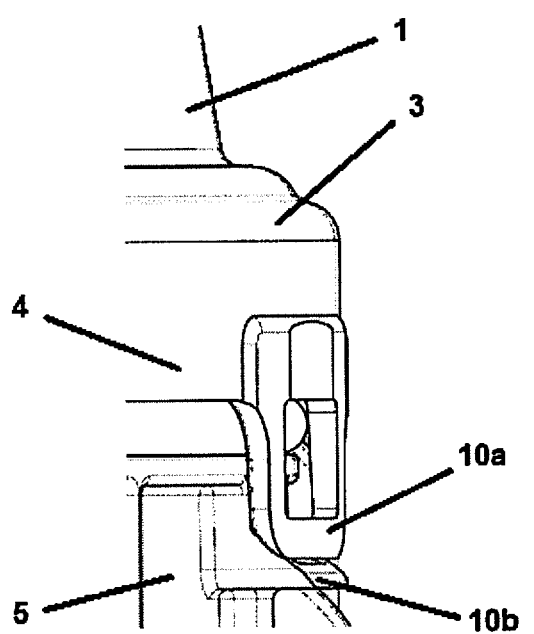
FIGS. 4a and 4b are a schematic representation of an example of kinematics of a snap-fitting mechanism of the device of the invention.
Figure 4B:
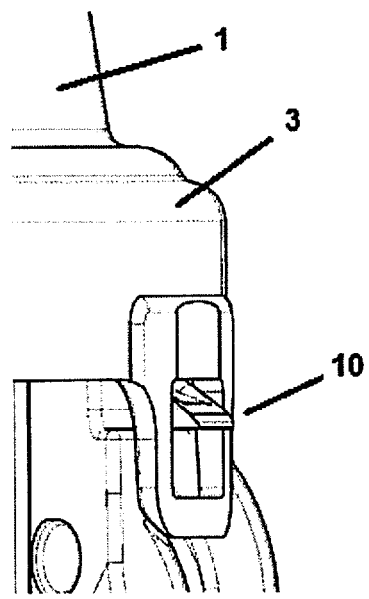

Thus, the subject of the invention is a device for assembling and fixing the orifice of a pipe 1 with a receiving orifice 2 to cooperate, characterized in that the device comprises:
- a first structure 3 bearing a first cooperation interface 3b surrounding a first 3a of the two orifices, this interface 3b comprising at least one skirt 4 disposed on at least a portion of the periphery of the first orifice 3a,
- a second structure 5 bearing a second cooperation interface 5b surrounding the second orifice 5a,
- a seal 7 disposed on the periphery of the join between the first cooperation interface 3b and the second cooperation interface 5b, the first cooperation interface 3b being positioned facing the second cooperation interface 5b so that:
- the skirt 4 of the first interface 3b is positioned at the periphery 6 of the second cooperation interface 5b surrounding the second orifice 5a, and
- the skirt 4 of the first interface 3b and/or an extension of the skirt 4 compresses at least a part of the seal 7 against a part of the second interface 5b.

It should be noted that, in the device of the invention, on the one hand, the first structure 3 which incorporates the skirt 4 and, on the other hand, the second structure 5 which bears the second cooperation interface 5b surrounding the second orifice 5a, can be associated without distinction with the pipe 1 or with the receiving orifice 2.

According to an exemplary construction, the receiving orifice 2 is borne by an end of a second pipe, by an air intake distributor or by any other element intended to be coupled with the first pipe 1.

According to a preferred exemplary construction, the skirt 4 constitutes an end of one of the two structures 3, 5 of the device.

According to a particular construction feature, the skirt 4 is produced by a continuous structure positioned over all the periphery of the orifice 3a surrounded by the corresponding cooperation interface 3b.

According to an alternative particular construction feature, the skirt 4 is produced discontinuously over the periphery of the cooperation interface 3b.

According to a nonlimiting particular production feature of the device of the invention, the seal 7 is produced by an O-ring seal.

Such an assembly device makes it possible to bring the cooperation interfaces 3b, 5b together while the skirt 4 of the first interface 3b slides along the periphery of the second interface 5b. The sliding of the skirt 4 relative to the periphery of the second interface 5b allows for guidance while the first interface 3b is brought toward the second interface 5b.

According to a particular construction feature, the dimensions of the periphery of the second interface 5b complement those of the skirt 4 such that the risk of offset or of inclination of the first interface 3b relative to the second interface 5b is reduced when the structures which bear these interfaces 3b, 5b and the corresponding orifices 3a, 5a are assembled.

According to another complementary specific feature of this particular construction feature, when the skirt 4 is produced continuously at the periphery of the corresponding orifice 3a, the inner diameter of the skirt 4 and the outer diameter of the peripheral face of the second interface 5b are substantially similar at at least one portion. This specific feature offers the advantage of allowing a displacement of the inner face of the skirt 4 against the peripheral face of the second interface 5b. This displacement of the skirt 4, produced wall against wall, thus ensures a guided insertion which avoids the inclination of one of the two interfaces 3b, 5b relative to the other.

According to a particular production feature of the invention, the skirt 4 of the first interface 3b is disposed on the axis of assembly of the two facing orifices 3a, 5a. Thus, according to this particular feature, in a section plane passing through the axis of assembly of the two orifices 3a, 5a, the skirt 4 has a structure disposed on an axis substantially parallel to the axis of assembly of the orifices 3a, 5a. Also, according to this particular feature, the axis of the skirt 4 corresponds substantially to the axis of insertion of the skirt 4 around the peripheral face of the second interface 5b.

According to another, possibly complementary, particular feature, in a plane at right angles to the axis of assembly of the two orifices 3a, 5a, the skirt 4 and the periphery of the second cooperation interface 5b are constructed to be substantially circular about this axis of assembly, at the periphery of the orifices 3a, 5a.

According to another particular production feature of the invention, the second interface 5a comprises a shoulder 8 positioned along a rim 9 at the periphery of the second cooperation interface (5b) and against which at least a part of the seal 7 is in contact. The shoulder 8 and the rim 9 are disposed so as to be substantially circular about the axis of assembly of the two orifices 3a, 5a, at the periphery of the orifices 3a, 5a. According to a specific feature of this particular feature, in a section plane passing through the axis of insertion of the skirt 4, the shoulder 8 has a structure disposed on an axis substantially parallel to the axis of insertion of the skirt 4 around the second interface 5b. Furthermore, according to another particular construction feature, in a section plane passing substantially through the axis of insertion of the skirt 4 around the second interface 5b, the shoulder 8 comprises a face 8a positioned facing the skirt 4 of the first interface 3b and/or an extension of the skirt 4. Also, by virtue of this particular construction feature, the seal 7 is positioned compressed in a volume produced by the face 8a of the shoulder 8, the rim 9 of the second interface 5b and the skirt 4 of the first interface 3b and/or a face of the extension thereof. According to a specific feature of this particular feature, the peripheral rim 9 has a width less than or at most equal to the width of the seal 7 so that the positioning of a face 8a of the shoulder 8 facing the skirt 4 of the first interface 3b and/or the extension thereof allows for an effective compression of the seal 7 between these two elements. Thus, the positioning of a face 8a of the shoulder 8 facing the skirt 4 of the first interface 3b and/or the extension thereof with a dimensioning of the rim 9 of the second interface 5b in accordance with the seal allows the first interface 3b and the second interface 5b of the device of the invention to apply an effective compression of the seal 7 and obtain a tight join between the first structure 3 and the second structure 5 of the device.

According to a particular construction feature of the device of the invention, the device is characterized in that, on a section plane passing through the axis of assembly, a face of the skirt 4 of the first interface 3b comprises a slope 4a disposed so as to face the seal 7. According to an exemplary construction of this slope 4a, the face of the skirt 4 provides a chamfer so that the skirt 4 takes the form of a bevel in a section plane passing through the axis of assembly of the two orifices 3a, 5a. This beveled skirt 4 is then produced such that the distal end of the skirt 4 situated closest to the second interface 5b has a lesser thickness than the thickness of the proximal end of the skirt 4 situated at a distance from the second interface 5b. Also, by virtue of this beveled form, of which the slope 4a faces the seal 7, the insertion of the skirt 4 around the second interface 5b is performed together with a progressive compression of the seal 7 by the face of the skirt 4 which bears the slope 4a.

According to a preferred arrangement, before the insertion of the skirt 4, the seal 7 has a width greater than the width of the rim 9 of the second interface 5b and projects at least partly beyond the periphery of the second interface 5b. When the skirt 4 is inserted around the second interface 5b, the distal end of the skirt 4 is positioned around the seal 7 so that the skirt 4 bears against the seal 7 to push it back compressed against the shoulder 8. The face of the skirt 4 which bears the slope 4a thus makes it possible to produce a progressive compression of the seal 7 against the shoulder 8 together with the insertion of the skirt 4 around the second interface 5b.

The progressive insertion of the skirt 4 around the second interface 5b, coupled with a progressive compression of the seal 7 is also reflected by an assembly of the two interfaces 3b, 5b of the device which can be done in two stages. A first stage corresponds to the positioning of the end of the skirt 4 at the periphery of the end of the second interface 5b so that the end of the skirt 4 surrounds the seal 7. A second stage corresponds to the insertion of the skirt 4 around the second interface 5b together with a compression of the seal 7 by the face of the skirt 4 which bears the slope 4a.

According to a particular construction feature, the length of the slope 4a of the skirt 4 of the first interface 3b is less than the height of the peripheral edge of the second interface 5b. Also, when the insertion of the skirt 4 around the second interface 5b is complete, the seal 7 is compressed by the proximal portion of the slope 4a of the skirt 4.

According to an alternative particular construction feature, the slope 4a of the skirt 4 is extended by a face of the first interface 3b intended to be positioned facing the shoulder 8 of the second interface 5b, in a section plane passing through the axis of assembly of the two interfaces 3b, 5b, to exert a pressure against at least a part of the seal 7.

According to a particular construction feature, the slope comprises a concavity 4a' oriented so as to face the seal 7. Such an arrangement notably contributes to the production of an end of the skirt 4 of tapered form so that the positioning of the end of the skirt 4 around the second interface 5b against the seal 7 is facilitated and allows the structures 3, 5 of the device to be positioned facing one another, before they are brought together, which can be performed manually without difficulty.

According to a particular construction feature, the two structures 3, 5 which bear the cooperation interfaces 3a, 5a incorporate at least one snap-fitting mechanism 10 which comprises a tongue or a loop 10a borne by a first of the structures 3, 5 and a retaining means 10b borne by the second of the structures 3, 5. This snap-fitting mechanism 10 contributes to the securing of the structures 3, 5 to one another by opposing their separation. This mechanism 10 produces a retaining system by which the tongue or the loop 10a is kept attached to the retaining means 10b so as to oppose the separation of the cooperation interfaces 3b, 5b of the device. Thus, this snap-fitting mechanism 10 allows for the structures 3, 5 of the device to be attached to one another as soon as the end of the skirt 4 is positioned at the peripheral face of the second interface 5b. The axial positioning of the skirt 4 relative to the second interface 5b at a first junction point close to the snap-fitting mechanism is thus maintained while another positioning of the skirt 4 relative to this second interface 5b is performed at a second junction point. This retaining system thus facilitates the relative positioning of the two interfaces 3b, 5b, so that the axis of assembly of the two orifices 3a, 5a is observed and maintained from the start of the insertion of the end of the skirt 4 around the second interface 5b.

According to another particular construction feature of the device, the elements which make up the snap-fitting mechanism 10 are positioned on the peripheral face of each of the structures 2, 5 of the device.

According to a particular construction feature of the device, several snap-fitting mechanisms 10 are disposed at different points of the periphery of the assembly device of the invention. Such a disposition of several snap-fitting mechanisms 10 facilitates the positioning and the assembly of the two interfaces 3b, 5b of the device so as to observe the axis of assembly of the two orifices 3a, 5a.

According to another particular construction feature of the device, the device is characterized in that the two structures 3, 5 which bear the cooperation interfaces 3b, 5b are associated with at least one tightening means 11 which can make it possible to bring the cooperation interfaces 3b, 5b closer together and/or into contact with one another, the tightening axis of the tightening means 11 being parallel to the axis of assembly of the two facing orifices 3a, 5a. According to a preferred arrangement of this particular construction feature, the tightening means 11 makes it possible to bring the interfaces 3b, 5b closer to one another once the skirt 4 is positioned relative to the seal 7 and to the periphery of the second interface 5b. This tightening mechanism 11 also makes it possible to optimize, in the context of the bringing together of the cooperation interfaces 3b, 5b, the compression of the seal 7 by the skirt 4 against, for example, the shoulder 8 of the second interface 5b.

Also, according to a preferred example of assembly, the two structures 3, 5 of the device are, initially, positioned relative to one another manually so that the end of the skirt 4 surrounds the seal 7 and the end of the second interface 5b, then, in a second stage, upon the actuation of the tightening means 11, the skirt 4 is inserted around the second interface 5b while the seal 7 is compressed between the two interfaces 3b, 5b. When the skirt 4 has a beveled construction with a slope 4a, the bringing together of the interfaces 3b, 5b requires a progressively greater effort because of the reaction of the seal 7 to the compression effort exerted by the two interfaces 3b, 5b.

According to a particular arrangement feature of the device, several tightening means 11 are disposed at different points of the periphery of the assembly device of the invention. Such a disposition of several tightening means 11 makes it possible to facilitate the bringing together of the two interfaces 3b, 5b of the device and the securing of these two joined interfaces 3b, 5b despite the reaction of the seal 7 to the compression effort that it withstands, while observing the axis of assembly of the two orifices 3a, 5a.

According to a specific feature of the tightening means 11, at least one tightening means 11 is provided by a threaded shaft 11a associated with an end stop 11b and, on the one hand, is mounted through a hole 11c passing through a first of the two structures 3, 5 which bear the cooperation interfaces 3b, 5b and, on the other hand, interacts with the threading of a hole 11d of the second structure positioned facing the hole 11c passing through the first of the two structures 3, 5.

One advantage of such a tightening means 11 is that it allows the generation of a tightening force greater than 100 newtons.

The invention also relates to a method for implementing an assembly device according to the invention, characterized in that the method comprises:
   a step of positioning the orifice 3a of the first structure 3 facing the orifice 5a of the second structure 5, on either side of a seal 7,
   a step of positioning the skirt 4 of the first structure 5 at the periphery of the second cooperation interface 5b of the second structure 5 and against the seal 7,
   a step of bringing the first structure 3 toward the second structure 5 by the implementation of at least one tightening means 11, such that the skirt 4 of the first structure 3 pushes back the seal 7 against a surface of the second structure 5, while the skirt 4 of the first structure 3 slides along the periphery of the second cooperation interface 5b of the second structure 5.

According to a particular feature of the method for implementing the device of the invention, the method also comprises a step of holding the skirt 4 in position at the periphery of the second cooperation interface 5b by at least one snap-fitting mechanism 10 snap-fitting the first structure 3 with the second structure 5, prior to the step of bringing the two structures 3, 5 closer together by a tightening means 11.

Obviously, the invention is not limited to the embodiment described and represented in the attached drawings. Modifications remain possible, notably from the point of view of the construction of the various elements or by the replacement of technical equivalents, without in any way departing from the scope of protection of the invention.

The invention claimed is:

1. A device for assembling and fixing an orifice of a pipe with a receiving orifice to cooperate at an axis perpendicular to the orifice of the pipe and the receiving orifice arranged face to face, said device comprising:
    a first structure bearing a first cooperation interface surrounding a first of the two orifices among the orifice of the pipe and the receiving orifice, this interface comprising at least one skirt disposed over at least a portion of a periphery of this first orifice,
    a second structure bearing a second cooperation interface surrounding the second orifice among the orifice of the pipe and the receiving orifice,
    a seal disposed on a periphery of the junction between the first cooperation interface and the second cooperation interface,
    the first cooperation interface being positioned facing the second cooperation interface so that:
    the skirt of the first interface is positioned at a periphery of the second cooperation interface surrounding the second orifice, and
    the skirt of the first interface and/or an extension of the skirt radially compresses at least a part of the seal against a part of the second interface,
    the second interface comprising a shoulder positioned along a rim at the periphery of the second cooperation interface and against which at least a part of the seal is in contact, and
    the two structures which bear the cooperation interfaces,
    first incorporate at least one snap-fitting mechanism which comprises a tongue or a loop borne by a first of the structures and a retaining means borne by the second of the structures and,
    second, are associated with at least one tightening means able to bring the cooperation interfaces closer together and/or into contact with one another according to a tightening axis, the tightening axis of the tightening means being parallel to the axis of assembly of the two facing orifices, this tightening means being provided by a threaded shaft associated with an end stop,
    first, by being mounted through a hole passing through a first of the two structures which bear the cooperation interfaces and,
    second, by interacting with a threading of a hole of the second structure positioned facing the hole passing through the first of the two structures.

2. The assembly device as claimed in claim 1, wherein the skirt of the first interface is disposed along the axis of assembly of the two facing orifices.

3. The assembly device as claimed in claim 1, wherein the peripheral rim against which at least a part of the seal is in contact has a width less than or at most equal to the width of the seal.

4. The assembly device as claimed in claim 1, wherein, on a section plane passing through the axis of assembly, a face of the skirt of the first interface comprises a slope disposed so as to face the seal.

5. The assembly device as claimed in claim 4, wherein the slope comprises a concavity oriented so as to face the seal.

6. The assembly device as claimed in claim 4, wherein the slope of the skirt of the first interface having a length, and a peripheral edge of the second interface having a height, the length of the slope of the skirt of the first interface is less than the height of the peripheral edge of the second interface.

7. The assembly device as claimed in claim 4, wherein the slope of the skirt is extended by a face of the first interface intended to be positioned facing the shoulder of the second interface, in a section plane passing through the axis of assembly of the two interfaces, to exert a pressure against at least a part of the seal.

8. A method for implementing an assembly device as claimed in claim 1, said method comprising the steps of:
    a step of positioning the orifice of the first structure facing the orifice of the second structure on either side of a seal,
    a step of positioning the skirt of the first structure at the periphery of the second cooperation interface of the second structure and against the seal,
    a step of bringing the first structure toward the second structure by the implementation of at least one tightening means, so that the skirt of the first structure pushes back the seal against a surface of the second structure, while the skirt of the first structure slides along the periphery of the second cooperation interface of the second structure,
    wherein said method also comprises a step of holding the skirt in position at the periphery of the second cooperation interface by at least one snap-fitting mechanism snap-fitting the first structure with the second structure, prior to the step of bringing the two structures together by a tightening means.

* * * * *